(12) United States Patent
Au et al.

(10) Patent No.: US 8,364,334 B2
(45) Date of Patent: Jan. 29, 2013

(54) SYSTEM AND METHOD FOR NAVIGATING AN AUTONOMOUS VEHICLE USING LASER DETECTION AND RANGING

(75) Inventors: Kwong Wing Au, Bloomington, MN (US); Alan B. Touchberry, St. Louis Park, MN (US); Brian VanVoorst, Minneapolis, MN (US); Jon Schewe, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 951 days.

(21) Appl. No.: 12/261,683

(22) Filed: Oct. 30, 2008

(65) Prior Publication Data

US 2010/0114416 A1 May 6, 2010

(51) Int. Cl.
*G01C 22/00* (2006.01)
(52) U.S. Cl. ........... 701/23; 701/408; 701/514; 701/448
(58) Field of Classification Search .................... 701/23, 701/514, 408, 448
See application file for complete search history.

(56) References Cited

U.S. PATENT DOCUMENTS

| | | | |
|---|---|---|---|
| 4,740,085 A | 4/1988 | Lim | |
| 5,050,423 A | 9/1991 | Czarnocki | |
| 5,367,898 A | 11/1994 | Matsuzaki | |
| 5,525,882 A | 6/1996 | Asaka et al. | |
| 5,956,250 A | 9/1999 | Gudat et al. | |
| 5,999,866 A | 12/1999 | Kelly et al. | |
| 6,002,983 A | 12/1999 | Alland et al. | |
| 6,298,288 B1 | 10/2001 | Li et al. | |
| 6,374,191 B1 | 4/2002 | Tsuchiya et al. | |
| 6,615,117 B2 | 9/2003 | Li et al. | |
| 6,679,702 B1 | 1/2004 | Rau | |
| 6,728,608 B2 * | 4/2004 | Ollis et al. | 701/28 |
| 6,754,370 B1 | 6/2004 | Hall-Holt et al. | |
| 6,778,924 B2 | 8/2004 | Hanse | |
| 6,823,261 B2 | 11/2004 | Sekiguchi | |

(Continued)

FOREIGN PATENT DOCUMENTS

WO 2008068542 6/2008

OTHER PUBLICATIONS

Batavia et al., "Autonomous Coverage Operations in Semi-Structured Outdoor Environments", "Robotics Institute", , Publisher: Carnegie Mellon University, Published in: Pittsburgh.

(Continued)

*Primary Examiner* — Mary Cheung
*Assistant Examiner* — Truc M Do
(74) *Attorney, Agent, or Firm* — Fogg & Powers LLC

(57) ABSTRACT

A system and method for providing information for autonomous vehicle navigation are disclosed. The system comprises at least one laser scanner configured to perform one or more range and intensity scans of an area around the autonomous vehicle, and a geo-location unit comprising one or more global positioning system sensors and inertial navigation system sensors. The system also includes at least one processor in operative communication with the laser scanner and the geo-location unit. The processor is configured to execute one or more program modules comprising a ground plane-based processing module configured to receive range scan data transformed into world coordinates, and output ground plane-based classification data; a range-based processing module configured to receive data from a single range scan, and output range-based classification data; an intensity-based processing module configured to receive intensity scan data, and output intensity-based classification data; and a classification fusion module configured to receive the classification data from each of the processing modules, and output range bin classification data.

20 Claims, 4 Drawing Sheets

U.S. PATENT DOCUMENTS

| | | | |
|---|---|---|---|
| 6,968,281 | B2 | 11/2005 | Hanse |
| 7,272,474 | B1 | 9/2007 | Stentz et al. |
| 7,643,966 | B2 * | 1/2010 | Adachi et al. ............... 703/1 |
| 7,742,841 | B2 | 6/2010 | Sakai et al. |
| 2003/0016161 | A1 * | 1/2003 | Okai et al. .................. 342/70 |
| 2005/0024492 | A1 * | 2/2005 | Schaefer et al. ............ 348/135 |
| 2005/0216237 | A1 * | 9/2005 | Adachi et al. ............... 703/1 |
| 2007/0219720 | A1 * | 9/2007 | Trepagnier et al. .......... 701/300 |
| 2008/0046150 | A1 * | 2/2008 | Breed ....................... 701/45 |
| 2008/0223107 | A1 | 9/2008 | Stewart |
| 2010/0106356 | A1 * | 4/2010 | Trepagnier et al. ........... 701/25 |

OTHER PUBLICATIONS

Campbell et al., "Flash—LADAR Inerital Navigator Aiding", "Position, Location, and Navigation Symposium", 2006, pp. 677-683, Publisher: IEEE.

Mcbride, James Ph.D., "Darpa Urban Challenge, Intlligent Vehicles Systems Technical Paper", Apr. 13, 2007, Published in: Dearborn, MI.

Fardi et al, "Hough Transformation Based Approach for Road Border Detection in Infrared Images", "IEEE Intelligent Vehicles Symposium", Jun. 14-17, 2004, Publisher: IEEE.

Fischler et al., "Random Sample Consensus: A Paradigm for Model Fitting With Applications to Image Analysis and Automated Cartography", "Communications of the ACM", Jun. 1981, pp. 381-395, vol. 24, No. 6, Publisher: ACM.

Jenkins, Bruce, "Laser Scanning: Darpa Urban Challenge", "http://www.amerisurv.com", Feb. 14, 2008, Publisher: The American Surveyor Magazine-Land Surveying and Mapping Online.

Latecki et al., "New EM Derived from Kullback-Leibler Divergance", "ACM SIGKDD International Conference on Knowledge Discovery and Data Mining", Aug. 2006, Publisher: ACM SIGKDD, Published in: Philadelphia.

Chartier, "Identifying Quadric Surfaces", , pp. 12, Publisher: Davidson.edu.

Cheng, "A New Method for Quadratic Curve Detection Using K-Ransac With Acceleration Techniques", "Pattern Recognition", 1995, pp. 663-682, vol. 28, No. 5, Publisher: Pattern Recogition Society, Published in: UK.

* cited by examiner

SYSTEM AND METHOD FOR NAVIGATING AN AUTONOMOUS VEHICLE USING LASER DETECTION AND RANGING

GOVERNMENT LICENSE RIGHTS

The U.S. Government may have certain rights in the present invention as provided for by the terms of contract number HR0011-06-9-0011 with DARPA.

RELATED APPLICATION

The present application is related to U.S. patent application Ser. No. 12/182,774, filed on Jul. 30, 2008, the disclosure of which is incorporated herein by reference.

BACKGROUND

Unmanned ground vehicles (UGVs) include remote-driven or self-driven land vehicles that can carry cameras, sensors, communications equipment, or other payloads. Self-driven or "autonomous" land vehicles are essentially robotic platforms that are capable of operating outdoors and over a wide variety of terrain.

Autonomous land vehicles can travel at various speeds under diverse road constructs. For example, an autonomous land vehicle can travel at the speed limit when traffic is sparse, at low speed during a traffic jam, or can stop at a traffic light. The autonomous land vehicle can also travel at a constant speed, as well as accelerate or decelerate. The road on which the vehicle traverses can be straight, curved, uphill, downhill, or have many undulations. The number of lanes on the road can vary, and there are numerous types of road side constructs such as curbs, lawns, ditches, or pavement. Objects on and off the road such as cars, cycles, and pedestrians add more complexity to the scenario. It is important to accurately classify these road elements in order that the vehicle can navigate safely.

Numerous sensors are typically mounted on board of autonomous land vehicles to aid in navigation. Some of these sensors include global positioning system (GPS) and inertial navigation system (INS) sensors, radar, video and IR cameras, and laser detection and ranging (LADAR) sensors. LADAR is also referred to as LIDAR (Light Detection and Ranging), typically in non-military contexts.

The navigation systems for autonomous land vehicles often have difficulty in processing the LADAR data and combining the GPS/INS data to accurately classify each range/reflectance measurement in a scan into one of traversable, non-traversable, lane-mark, and obstacle classes. Classification of the range measurements based only on one input scan and its corresponding GPS/INS input is not robust enough with the diversity of vehicle states and road configurations that can be encountered.

In some navigation systems, each range measurement in a scan is classified based on a history of recent range scans. A fixed-size history buffer is employed having a size based on a fixed number of range scans. Consequently, the distance covered by the range scans saved in this buffer depends on the speed of the vehicle. When the vehicle travels at high speed, the area coverage in a fixed number of scans is large. When the vehicle travels at slow speed, the area coverage is small. Using the scans in the fixed-size buffer for ground plane estimation causes varying degrees of inaccuracy.

In addition to accurately knowing the road versus the non-traversable areas, autonomous vehicle navigation systems would also be benefited by knowing the markings on the roads such as lane marks, which would allow for lane following and/or lane changing maneuvers. While some LADAR systems provide reflectance measurements along with range measurements, current navigation systems do not provide for using reflectance measurements to derive markings on the road.

SUMMARY

The present invention is related to a system and method for providing information for autonomous vehicle navigation. The system comprises at least one laser scanner configured to perform one or more range and intensity scans of an area around the autonomous vehicle, and a geo-location unit for the autonomous vehicle, with the geo-location unit comprising one or more global positioning system sensors and one or more inertial navigation system sensors. The system also includes at least one processor in operative communication with the laser scanner and the geo-location unit. The processor is configured to execute one or more program modules comprising a ground plane-based processing module configured to receive range scan data transformed into world coordinates, and output ground plane-based classification data; a range-based processing module configured to receive data from a single range scan, and output range-based classification data; an intensity-based processing module configured to receive intensity scan data, and output intensity-based classification data; and a classification fusion module configured to receive the classification data from each of the processing modules, and output range bin classification data.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
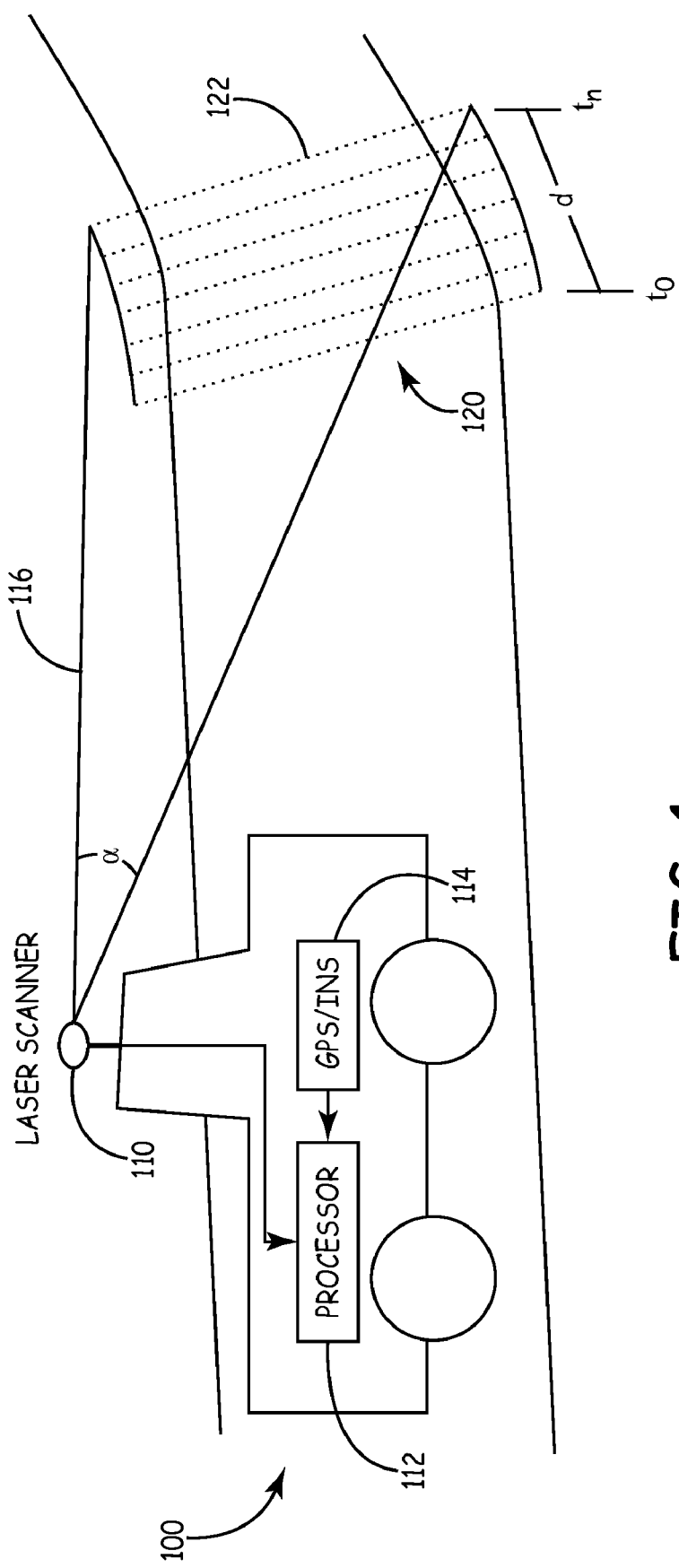
FIG. 1 illustrates a laser scanning system in an autonomous land vehicle according to one embodiment of the invention.

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a method and system that apply laser range processing techniques for road and obstacle detection in navigating an autonomous vehicle through varied terrain. The information obtained and used by the laser range processing techniques can be employed to build a world map of what is around the autonomous vehicle to help the vehicle successfully navigate.

In the present method and system, range scan and intensity scan data are processed with navigation data to provide a situation awareness, which includes the detection of traversable areas, non-traversable areas, or obstacles, as well as identifying the markings on the road area. Traversable areas include, for example, roads, large flat areas, and the like. Non-traversable areas include, for example, road curbs, pedestrian walkways, steep slopes, and the like. Obstacles include objects of a certain size and height that a vehicle cannot traverse over, such as other vehicles, pedestrians, and the like. The reflectance measurements from the intensity scan data can be used to derive the markings on the road. By knowing the markings on the road such as lane marks, the present method and system allows for lane following and/or lane changing maneuvers. The resulting situation awareness from the foregoing allows the autonomous vehicle to plan a route and maneuver such that the vehicle safely reaches its destination.

In order to implement a plan for reaching a destination safely, an automonous vehicle such as an automonous land vehicle must know the locations of the roads, the markings on the roads, and any obstacles ahead. A suitable instrument that can be used to acquire this information is a laser scanner such as a laser detection and ranging (LADAR) sensor, which can scan a laser beam across the ground around the vehicle in a back and forth sweeping motion. The scanning rate can be variable, and every scanner sweep once across the ground produces data to be processed. The range measurements from one scanner sweep are referred to herein as a "range scan."

A LADAR sensor emits and receives laser beams as it scans horizontally across its field of regard. Since the laser beam has a very narrow beam width, the scanned area is essentially a line across the forward area. Thus, the LADAR measures the ranges to the target areas. The LADAR sensor can also measure the reflectance of the target area based on the returned signal strength. Hence, the LADAR sensor of the invention outputs a vector of the range measurements and a vector of reflectance measurements of each scan.

In the present system, one or more LADAR sensors are mounted on a vehicle. The locations and viewing of the LADAR sensors are placed such that a road can be detected at various speeds and directions of travel. One or more global positioning system (GPS) and inertial navigation system (INS) sensors are implemented in the vehicle to provide the vehicle state and coordinates. The outputs of the LADAR sensor and the GPS/INS sensors are sent to a processing unit, which performs the synchronization and road detection processes of the invention.

When mounted on an autonomous land vehicle, the LADAR sensor outputs sequences of scans of range and reflectance measurements. The on-board GPS and INS sensors provide the geo-location and dynamics of the vehicle, which includes the north, east, altitude of the vehicle in world coordinates, the velocity, and angular velocity of the vehicle. In addition, ancillary information such as the number of lanes on a road, and lane width may be available for use in processing the data.

A calibration process can be used to accurately register the relative positions of the LADAR sensor with respect to the GPS/INS sensors. This enables the world coordinate transformation of the LADAR sensor to a common world coordinate that is also used by the navigation system. The calibration process also registers the viewing angle of the LADAR sensor, especially the depression angle. The calibration process accurately registers the relative positions and pointing angles of the LADAR sensor with respect to the GPS/INS. The X, Y, Z coordinate linear offset is important as well as the stare angle relative to the X, Y, Z cardinal directions and the width of the scan (alpha, $\alpha$, in FIG. 1.)

The present method can be performed in real-time such that the vehicle can plan and maneuver using the results of the range processing. Often, the GPS/INS sensors operate at a faster rate than the LADAR sensor. Thus, care must be taken to determine the range/reflectance measurements in world coordinates, especially when the vehicle is traveling at high speed. As used herein, the term "high speed" refers to when the speed of a scan compared to the velocity of the vehicle is such that the scan substantially forms a diagonal across the area in front of the vehicle rather than a perpendicular line as would be the case when the vehicle is stationary. The phrase "substantially forms a diagonal" is subject to the application of use, the type of terrain being crossed, and the accuracy needed for establishing obstacles.

The present method is robust to the various vehicle operations such as speed, turns, acceleration, de-acceleration, and stop, and also to the various road configurations such as uphill, downhill, curve, and straight. The method is also robust to rough road conditions that induce short roll and pitch motions independent of large scale uphill and downhill. The method can also classify items such as a curb at a driveway to be uphill or downhill even though the street and driveway are flat and level.

The method of the invention can be implemented in software, firmware, or embedded in application specific hardware. Various implementations of the present invention are described in further detail hereafter with respect to the drawings.

FIG. 1 illustrates one embodiment of a laser scanning system in an autonomous land vehicle 100 for road and obstacle detection in navigating vehicle 100. The laser scanning system includes at least one laser scanner 110 mounted on vehicle 100. The laser scanner 110 is configured to scan the land around vehicle 100 in a sweeping pattern, and measure ranges and intensities in a scan region 120, with a fixed size area. The fixed size area is based on a fixed distance d and a scan angle $\alpha$. In one embodiment, the laser scanner 110 includes at least one light detection and ranging (LADAR) device.

The laser scanner 110 is operatively coupled to a processing unit 112 in vehicle 110. The processing unit 112 can be a computer, a digital signal processor (DSP), or a field programmable gate array (FPGA), which form part of the laser scanning system.

An on-board geo-location unit 114 in vehicle 100 is also operatively coupled to processing unit 112. The geo-location unit 114 can be used to accurately determine a position of vehicle 100, and can include one or more global positioning system (GPS) sensors, and one or more inertial navigation system (INS) sensors such as one or more inertial measurement units (IMUs). The GPS and INS sensors provide data related to the geo-locations and dynamics of vehicle 100. Such data is used to determine the position and attitude of vehicle 100 in world coordinates, and the velocity and angular velocity of vehicle 100. As vehicle 100 is traveling, laser scanner 110 sweeps a beam 116 across a line segment 122 of scan region 120 and measures ranges at discrete points along line segment 122.

Figure 2:
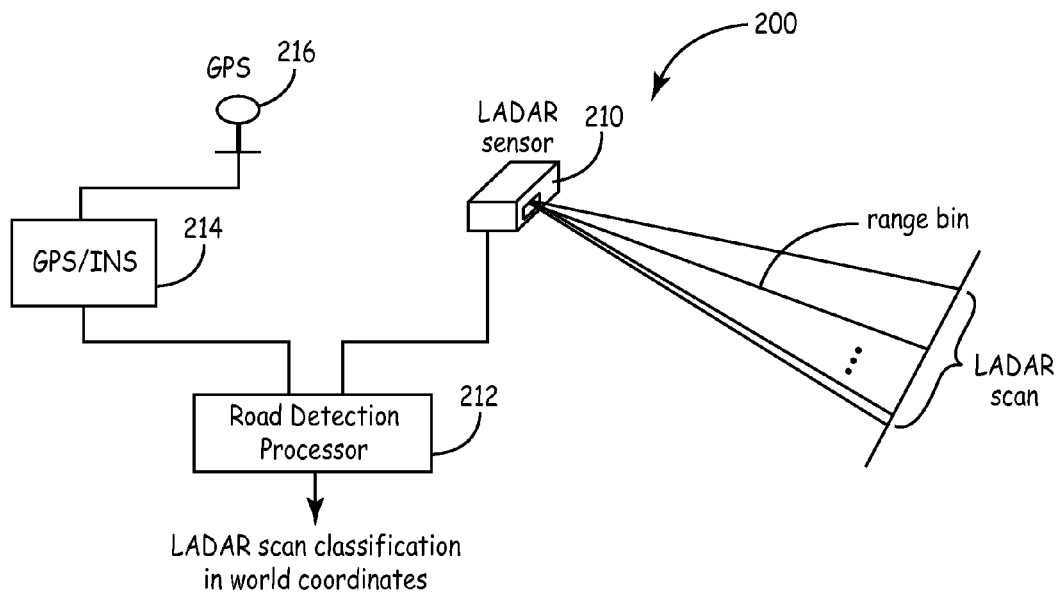
FIG. 2 illustrates one embodiment of a LADAR scanning system that can be implemented in the autonomous land vehicle of FIG. 1.

FIG. 2 illustrates one embodiment of a LADAR detection and ranging system 200 that can be implemented in vehicle 100. The system 200 includes at least one LADAR sensor 210, a road detection processor unit 212, and a GPS/INS unit 214 coupled to a GPS antenna 216. The LADAR sensor 210 measures the distance and reflectance across a LADAR scan of land around sensor 210, such as in front of sensor 210, which is used to determine range bin data. The GPS/INS unit 214 records the world coordinates and attitude of the vehicle, which can be used to determine the LADAR world coordinates through a coordinate transformation.

The processor unit 212, upon receiving the outputs from LADAR sensor 210 and GPS/INS unit 214, classifies the LADAR scan outputs and reports the classifications in world coordinates. This can be accomplished by using the following processes: assignment of world coordinates; application of range-based processing; application of ground plane estimation; application of intensity-based processing; application of auxiliary road information; and application of fusion to combine the classification results from the above processes. Each of the foregoing processes is described in further detail as follows and with respect to FIG. 3, which is a functional block diagram showing the data processing functions that can be performed by processor unit 212.

Figure 3:
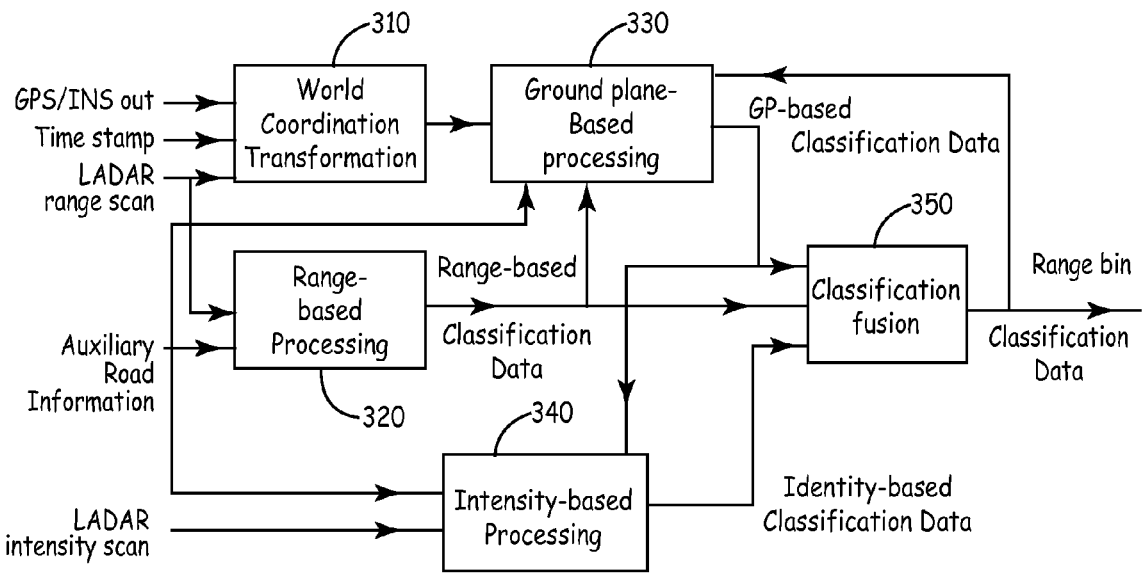
FIG. 3 is a functional block diagram depicting the data processing functions performed by the scanning system of FIG. 2.

FIG. 3 depicts the overall processes of the LADAR detection and ranging system. In general, a World Coordination Transformation (WCT) unit 310 converts the measurements in each range scan to positions in the world coordinate. The reflectance measurements are associated with the world coordinates. A range-based processing module 320 classifies the range measurements based only on one range scan. This classification is used as supportive evidence in a fusion classification module 350. A ground plane-based processing module 330 classifies the world-coordinate-transformed range measurements based on the distances from an estimated ground plane. An intensity-based processing module 340 classifies the reflectance measurements into road marks or non-road marks. Lastly, the classification fusion module 350 combines all the classification results into unified results, which are forwarded to a navigation planner.

Assignment of World Coordinates

The assignment of a world coordinate to each LADAR distance/reflectance measurement is needed for successful vehicle navigation. As shown in FIG. 3, a LADAR range scan and GPS/INS measurements are input into WCT unit 310, which is configured to combine the range measurement data with the navigation data to determine a coordinate transformation. Both the LADAR range scan and the GPS/INS measurements are time stamped. Matching the closest timestamps between that of the GPS/INS measurements and that of the LADAR range scan gives a fairly accurate measurement.

The WCT unit 310 transforms the range measurements in a range scan, which are recorded as the azimuth angles and ranges with respect to a location of the LADAR sensor, to Universal Transverse Mercator (UTM) world coordinate data with respect to a reference location, e.g., the starting point of the route. This transformation is a standard technique given the vehicle's UTM coordinate, a lever arm from the geolocation unit to the LADAR sensor, and the range scan measurements.

The data rate of a GPS/INS subsystem is normally higher than that of the LADAR scan. Therefore, during the interval of collecting a range scan, more than one GPS/INS reading is collected. A precise GPS/INS reading is associated with the LADAR beam based on the vehicle velocity and acceleration. Transformation of the range scan into the world coordinate requires a synchronized GPS/INS output.

In conventional approaches, the transformation is often applied to all the ranges (e.g., $r_a, \ldots r_i, \ldots r_m$) in a range scan using the first matched INS/GPS data. This can cause inaccurate transformation, especially for those ranges at the end of the range scan. When the vehicle is traveling at high speed, the error can be substantial.

Figure 4:
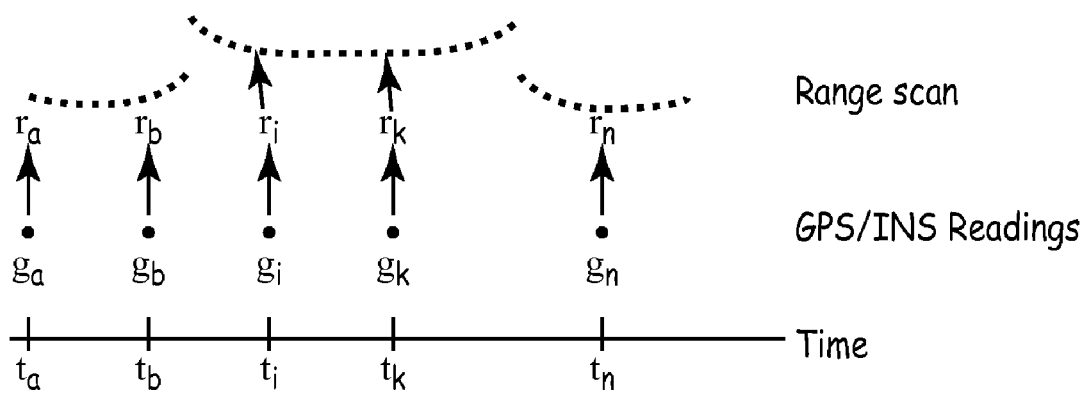
FIG. 4 is a timeline diagram showing the association of navigation readings collected during a range scan to the corresponding range data.

The present method associates all the GPS/INS readings (g) collected during a range scan to the corresponding range data (r). For Example, FIG. 4 is a timeline diagram showing the association of $g_a$ to $r_a$, $g_b$ to $r_b$, $g_i$ to $r_i$, $g_k$ to $r_k$, and $g_n$ to $r_n$ from time $t_a$, $t_b$, $t_i$, $t_k$, and $t_n$. The association between $g_i$ to $r_i$ can be based on the velocity of the vehicle, which is part of the INS outputs, or based on a regular interval assuming a constant velocity. Interpolation between the actual GNS/INS readings generates the estimated GNS/INS data for the world coordinate transformation of the range data in between, for example, between $r_a$ and $r_b$. This provides a more accurate world coordinate to the LADAR measurements within each scan, especially when the vehicle travels a long distance within one LADAR scan, such as at a high speed.

Range-Based Processing

The application of range-based (single scan) processing is used for coarse road, obstacle, and curb area detection. This range-based processing identifies the range bins that are road elements in a single LADAR scan. As shown in FIG. 3, a single LADAR range scan is input into range-based processing module 320, along with being input into WCT unit 310. As discussed further hereafter, auxiliary road information can also be input into range-based processing module 320. The range-based processing approach is useful under conditions when the GPS/INS is not available and allows the vehicle to coast along until the GPS/INS is acquired again.

The range-based processing performs signal conditioning and a preliminary classification of the range bins in a range scan. The range scan often is noisy and has missing range bin measurements. This occurs when the surface has poor reflection, e.g., a wet surface after raining or too shallow a viewing angle. The range scan is subjected to a smooth filter that averages out the noise, and fills in the missing range bins by interpolation while maintaining the edge contrast.

Figure 5:
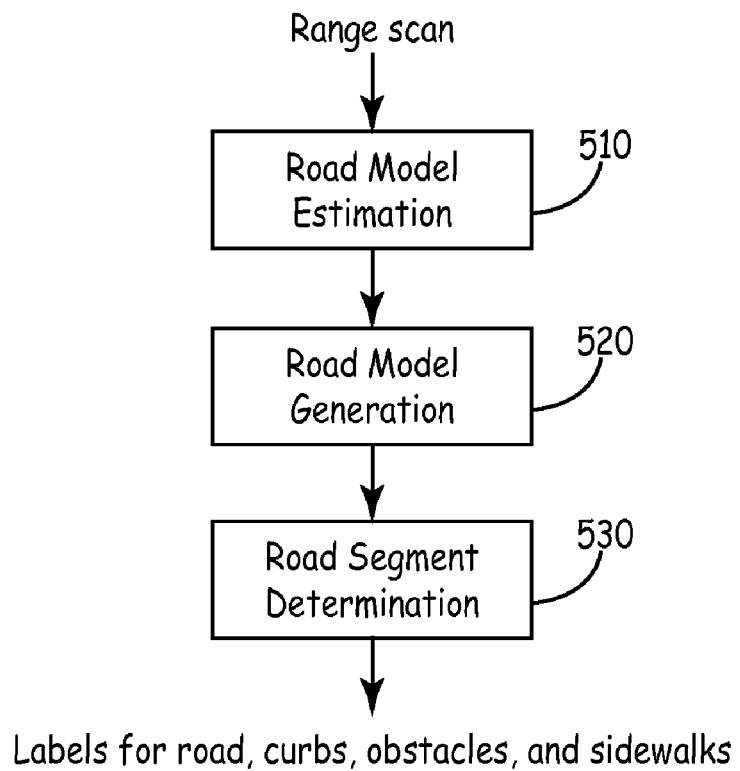
FIG. 5 is a data flow diagram for a range-based processing module according to the invention.
Figure 6:
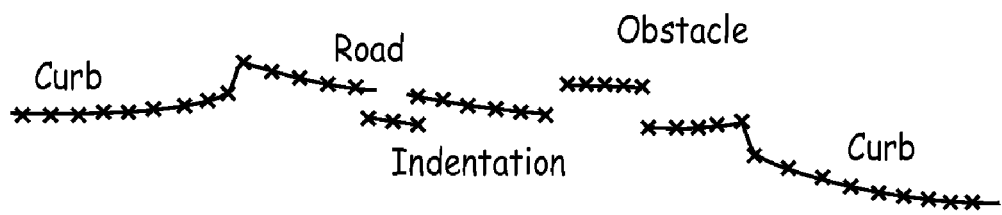
FIG. 6 depicts a representative single LADAR range scan.

The classification of range bins in the range-based processing is fast and does not require additional information. As shown in FIG. 5, the range-based processing module includes a road model estimation program 510 that receives a range scan, a road model generation program 520 that receives an output from road model estimation program 510, and a road segment determination program 530 that receives an output from road model generation program 520. The road segment determination program 530 outputs labels for the road, curbs, obstacles, sidewalks, and the like. A representative single LADAR range scan, shown in FIG. 6, can include segments of curbs, road, obstacles, and/or indentations (e.g., potholes).

A road segment of the range scan is modeled by the parabolic equation:

$$y = ax^2 + bx + c$$

where y is the range values and x is the horizontal sweeping angles. The parameters a, b, and c must be estimated from the range data in the range scan. The range scan can include the road segment, curbs, and a sidewalk. Structures, such as walls, trees, cars, and other obstacles may also appear in the range scan. Using a least square fit method will not provide a good estimate because of the presence of many outlier elements (e.g., curb elements) in the LADAR scan other than the road, such as a sidewalk. As a result, least square fit may produce a parabola such as "Fit C" in the range scan of FIG. 7, where the most proper match is "Fit A". A road segment can be found through a curvature fit of the LADAR scan data to the parabolic equation as follows.

Figure 7:
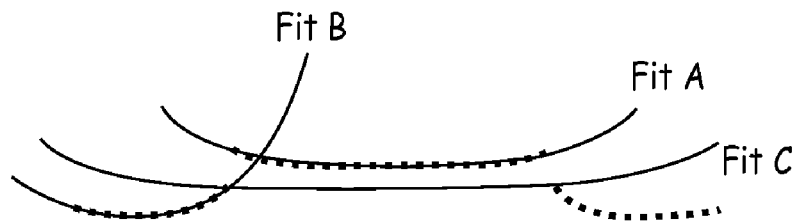
FIG. 7 depicts a few possible curvature matches with a representative LADAR range scan.

A RANSAC (RANdom SAmple Consensus) process, which is immune to outliers, is applied to estimate the parameters a, b, and c of the parabolic equation for the road. In addition, to obtain the estimate for the road and not the other segments, the curvature of the resulting parabola is constrained to a small value based on the anticipated curvature of the road. This ensures that the road segment is found, for example, "Fit A" instead of "Fit B" as shown in FIG. 7. Once the parameters of the optimal parabola are estimated, the road model (i.e., the y's of the parabola) is generated and compared to the range data in the range scan. The road segment is determined by the range data (bins) whose distances from the parabolic road model are less than a threshold.

Further details regarding the RANSAC process are in an article by M. A. Fischler, R. C. Bolles, "Random Sample Consensus: A Paradigm for Model Fitting with Applications to Image Analysis and Automated Cartography," *Comm. of the ACM* 24: 381-395 (June 1981), which is incorporated herein by reference.

Ground Plane Estimation

The application of ground plane estimation from cumulative scans provides for robust, accurate classification. As depicted in FIG. 3, coordinate transformation output data and range-based classification output data are sent to the ground plane-based processing module 330. Optionally, auxiliary road information can also be sent to the ground plane-based processing module 330.

The ground plane processing identifies the range bins that are road elements based on a history of the road elements in previous LADAR scans. The world coordinates of the road elements in previous LADAR scans, which are stored in a buffer, are used to estimate a ground plane. The heights of the world coordinates of the input LADAR scan to the ground plane are measured. The heights that are close to the ground plane as compared to a road threshold are considered as the road elements. The world coordinates whose heights are above the curb threshold are considered as obstacles. The remaining world coordinates whose heights are in between the two thresholds are considered as a curb. The identified road elements are updated and stored in the buffer and a new ground plane is computed. In one implementation, a variable size buffer is used that stores road elements within a fixed distance coverage area of the range scans regardless of the speed of the vehicle. For example, as shown in FIG. 1, the distance covered, d, is kept fixed for the range scans that are saved in the buffer, and the time for scanning ($t_0$ to $t_n$) and the buffer size vary. The ground plane estimate is always computed from the road elements of previous n distance away.

The ground plane is modeled with a quadratic surface with a restricted curvature surface. A quadratic surface is preferred over a planar surface because the former more accurately models the various road structures, such as undulation, curved road, transition from level to slope and vice versa. A RANSAC-based process is also applied in the ground plane estimation.

Further details related to ground plane estimation are described in copending U.S. application Ser. No. 12/182,774, which is incorporated herein by reference.

Intensity-Based Processing

Most laser scanners also measure the reflectance of the scanned area in addition to the range, with the reflectance returned as an intensity value. As road markings have different reflection properties than a road surface, such properties are used to identify a road lane based on intensity values. The present intensity based processing identifies the markings on the road, for example, the lane mark and the stop line. Identification of the road markings aids the navigation of a vehicle for lane changing and lane following.

As depicted in FIG. 3, a LADAR intensity scan and range-based classification output data are sent to the intensity-based processing module 340. Optionally, auxiliary road information can also be sent to the intensity-based processing module 340. The intensity-based processing finds the road marks by a negation method that determines the road element, with the remaining elements being the road marks. For example, the intensity-based processing differentiates the paint and lane marks from other road elements based on their differences in reflectance, which the LADAR returns as an input intensity array.

Figure 8:
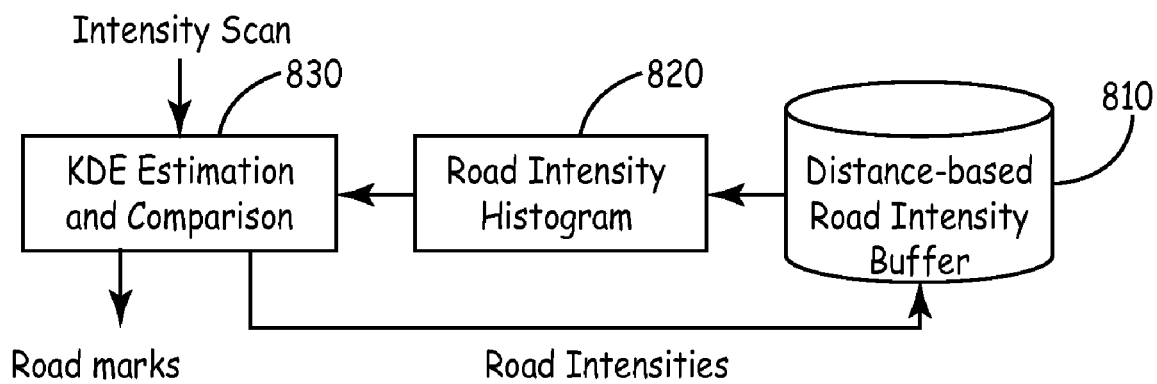
FIG. 8 is a functional block diagram depicting data processing functions of an intensity-based processing module according to the invention.

As shown in FIG. 8, during intensity-based processing, the histories of road element intensity scans of recent road areas are stored in a distance-based buffer 810. A histogram 820 is generated from the road intensities stored in buffer 810 from multiple previous scans. Assuming that uncertainty exists in the measurements, the likelihood of a road element is determined using a kernel density estimator (KDE) 830, which computes the road intensity distribution of the road elements based on the histogram and a current intensity scan.

The input intensity array is compared against the road intensity distribution, which is computed based on a kernel density estimation (KDE). The kernel density is modeled by a Gaussian distribution. For each of the intensity values, $I_i$, from an intensity scan, a probability, $p(I_i)$ of $I_i$ being a road is computed as:

$$p(I_i) = \frac{1}{N} \sum_{j=1}^{N} \frac{1}{\sqrt{2\pi\sigma^2}} e^{-\frac{1}{2}\frac{(I_i - H_j)^2}{\sigma^2}}$$

where $H_j$ is the jth element of the road intensity histogram, N is the number of samples in the estimation, and $\sigma$ is the standard deviation of the Gaussian distribution. If $p(I_i)$ is larger than or equal to a threshold, then the road intensity, $I_i$, is a road element, and the road intensity is stored in the distance-based road intensity buffer. Otherwise, if $p(I_i)$ is less than a threshold, then the road intensity, $I_i$, is a road mark. Accordingly, data related to the road marks is output from KDE 830, and data related to the road intensities is fed back to buffer 810 from KDE 830.

Auxiliary Road Information

Any available auxiliary road information can be used to enhance the performance of the above-described processing modules. The auxiliary road information, which includes, but is not limited to, number of lanes, width of the lane/road, road structure, etc., is parameterized and used as a guide or constraint to delineate the markings and boundaries of the road. For example, the number of lanes on the road, after translating into a number of range bins for the road, can be used to guide the detection of the edges of the road.

Application of Data Fusion

The application of data fusion classification combines the results of the above processing modules, yielding the final range bin classification for the input LADAR scan. As depicted in FIG. 3, ground plane-based (GP-based) classification data, range-based classification data, and intensity-based classification data are each output from a respective processing module to the classification fusion module 350.

Rule-based and weighed sum fusion methods can be used to obtain the classification fusion. The rule-based method assigns confidences to the results of each processing module under various conditions. For example, when the vehicle is turning, the range-based processing is less reliable and less confidence is applied to the results. The weighed sum method then classifies the range bins based on the sum of the results that are scaled by the confidences.

The final range bin classification data is output from the classification fusion module 350 to a path planner to determine a route for navigating an autonomous vehicle. Additionally, the final range bin classification can be fed back to the ground plane-based processing module 330 for use in further data processing.

Each of the foregoing processing functions and applications can be applied as needed to provide appropriate navigation data for the vehicle. For example, both range-based processing and ground plane-based processing can be utilized simultaneously if enough processing power is provided, which also produces the most accuracy for navigation. If there is not enough processing power available, then one of the range-based processing or ground plane-based processing can be engaged without the other. As the range-based processing employs one input scan, this approach should only be used alone when auxiliary road information is present. If there is no auxiliary road information, then the ground plane-based processing should be employed. The intensity-based processing is independent from the other processing techniques and is used when road markings need to be identified. If road marking data is not needed, then the intensity-based processing is not utilized for navigation.

Instructions for carrying out the various process tasks, calculations, and generation of signals and other data used in the operation of the method and system of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented by computer executable instructions, such as program modules, which are executed by a processor. Generally, program modules include routines, programs, objects, data components, data structures, algorithms, and the like, which perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for providing information for autonomous vehicle navigation, the system comprising:
    at least one laser scanner configured to perform one or more range and intensity scans of an area around the autonomous vehicle;
    a geo-location unit for the autonomous vehicle, the geo-location unit comprising one or more global positioning system sensors, and one or more inertial navigation system sensors; and
    at least one processor in operative communication with the laser scanner and the geo-location unit, the processor configured to execute one or more program modules comprising:
        a ground plane-based processing module configured to receive range scan data transformed into world coordinates, and output ground plane-based classification data;
        a range-based processing module configured to receive data from a single range scan, and output range-based classification data;
        an intensity-based processing module configured to receive intensity scan data, and output intensity-based classification data; and
        a classification fusion module configured to receive the classification data from each of the processing modules, and output range bin classification data.

2. The system of claim 1, wherein the at least one laser scanner comprises a laser detection and ranging device.

3. The system of claim 1, wherein the processor comprises a computer, a digital signal processor, or a field programmable gate array.

4. The system of claim 1, wherein one or more of the processing modules are configured to receive auxiliary road information.

5. The system of claim 1, further comprising a coordinate transformation module configured to receive and transform range scan data into world coordinates.

6. The system of claim 5, wherein the coordinate transformation module is configured to receive navigation data from the geo-location unit.

7. The system of claim 6, wherein the range scan data and the navigation data are time stamped.

8. The system of claim 1, wherein the ground plane-based processing module is configured to receive range-based classification data from the range-based processing module.

9. The system of claim 1, wherein the ground plane-based processing module is configured to receive range bin classification data from the classification fusion module.

10. The system of claim 1, wherein the intensity-based processing module is configured to receive range-based classification data from the range-based processing module.

11. The system of claim 1, wherein the range-based processing module comprises:
   a road model estimation program configured to receive range scan data;
   a road model generation program configured to receive output data from the road model estimation program; and
   a road segment determination program configured to receive output data from the road model generation program, and generate labels for one or more of a road, a curb, an obstacle, or a sidewalk.

12. The system of claim 1, wherein the intensity-based processing module comprises instructions to:
   store distance-based road intensities in a buffer from multiple previous scans;
   generate a histogram from the road intensities stored in the buffer; and
   compute a road intensity distribution of road elements based on the histogram and a current intensity scan using a kernel density estimator.

13. A method for providing information for navigating an autonomous vehicle, the method comprising:
   scanning a distance around the autonomous vehicle to obtain a current range scan;
   obtaining navigation data, including dynamics, position, and orientation measurements of the autonomous vehicle, during the scanning of the distance;
   processing the current range scan and the navigation data using one or more program modules comprising:
      a ground plane-based processing module configured to receive range scan data transformed into world coordinates and output ground plane-based classification data;
      a range-based processing module configured to receive data from a single range scan and output range-based classification data; and
      an intensity-based processing module configured to receive intensity scan data and output intensity-based classification data.

14. The method of claim 13, wherein when the current range scan and the navigation data are processed using more than one of the processing modules, the method further comprises:
   fusing the classification data output from the processing modules; and
   outputting range bin classification data based on the fused classification data.

15. The method of claim 14, wherein the range bin classification data is fed back to the ground plane-based processing module.

16. The method of claim 13, wherein the range scan data is transformed into world coordinates by a coordinate transformation module that receives the current range scan and the navigation data.

17. The method of claim 13, wherein one or more of the processing modules receive auxiliary road information.

18. The method of claim 17, wherein the current range scan and the navigation data are time stamped.

19. The method of claim 13, wherein the range-based processing module comprises:
   a road model estimation program that receives range scan data;
   a road model generation program that receives output data from the road model estimation program; and
   a road segment determination program that receives output data from the road model generation program, and generates labels for one or more of a road, a curb, an obstacle, or a sidewalk.

20. The method of claim 13, wherein the intensity-based processing module performs a process comprising:
   storing distance-based road intensities in a buffer from multiple previous scans;
   generating a histogram from the road intensities stored in the buffer; and
   computing a road intensity distribution of road elements based on the histogram and a current intensity scan using a kernel density estimator.

* * * * *